P. K. DEDERICK.
Press for Baling Hay and Cotton.
No. 132,566.                 Patented Oct. 29, 1872.
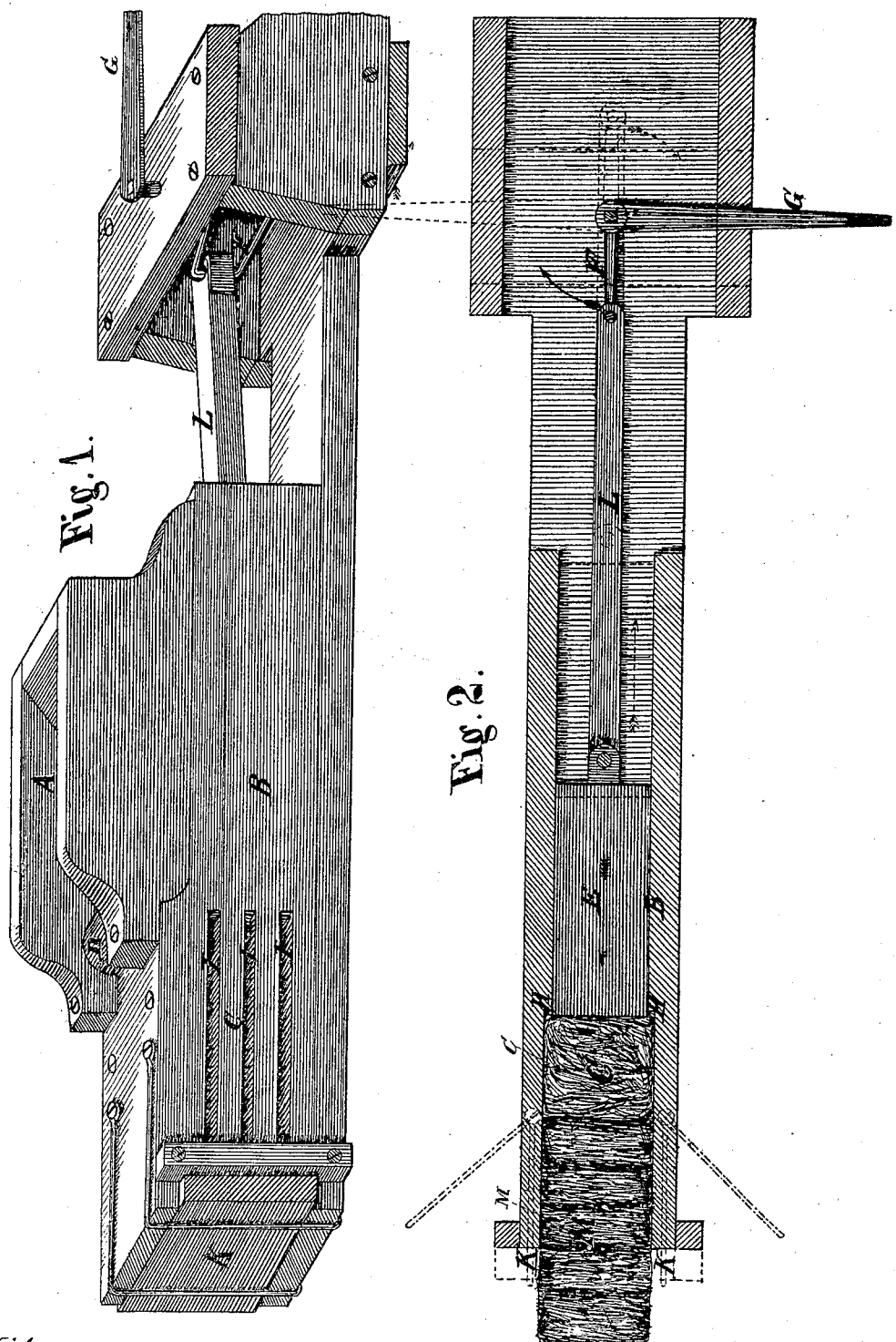
Witnesses.
Inventor.

UNITED STATES PATENT OFFICE.

PETER K. DEDERICK, OF ALBANY, NEW YORK.

IMPROVEMENT IN PRESSES FOR BALING HAY AND COTTON.

Specification forming part of Letters Patent No. 132,566, dated October 29, 1872.

*To all whom it may concern:*

Be it known that I, PETER K. DEDERICK, of the city of Albany, county of Albany and State of New York, have invented certain new and useful Improvements in Baling-Presses, of which the following is a specification:

My improvements consist in the form and construction of the machine as per specification following, and in the novel manner of forming and discharging the bale.

Figure 1 is a perspective view, showing the machine completed and in position for operation. Fig. 2 is a top view, showing my improvements and their connections, and the manner of pressing and discharging the bale.

In the figures, A is the hopper for receiving the loose material, and is constructed with an adjustable bottom. B is the press-box, into which the loose hay is received and pressed. C is the bale-chamber, into which the hay is deposited after pressing. D is a roller to assist in guiding the hay into the press-box. E is the plunger, which is constructed so as to close the hopper-bottom during the pressing-operation. F is a crank forming a toggle in connection with the pitman L. This arrangement would also operate another press of similar construction at the opposite side of the crank, and without expense of power, thus constituting a double machine. G is the sweep to which the horses are attached, although the power may be applied in a variety of ways. The press-box B, Fig. 2, is a little smaller than the bale-chamber C, so as to form a shoulder at H, to prevent the compressed material from expanding or following the plunger back. I construct the plunger with contracting front, so as to wedge together when the hay overlaps its top, thus preventing its binding. It resumes its dimensions again by its own flexibility, as shown, or springs or rubber may be substituted. The bale when formed in the bale-chamber C is tied or bound through the slots I I I in the box, as shown in Fig. 1, and is removed or forced out of the end of the press at K, by the pressure exerted by the plunger in building up the next bale, as shown, C being the forming bale, and M the finished bale. The distance between the head of the press and the plunger when nearest the head—or, in other words, the distance between the retainers that prevent the hay from expanding and the head—is greater than the dimensions of the bale-chamber any other way, thus forming the length of the bale toward the plunger or point of filling, and as the expansion is always in the same direction toward the plunger or power, it will be proportionately less, as the ends are smaller.

In operation the horses are attached to the sweep or lever G; the hay or other material to be pressed is pitched into the hopper A, whence it falls into the press-box B, and is forced into the bale-chamber C by the plunger E; meantime the hopper A is again filled, the plunger, or an equivalent slide attached, forming the bottom, which is withdrawn by the revolutions of the crank in connection with the pitman, and the loose hay of its own gravity falls from the hopper into the press-box. This is continued until the bale-chamber is pressed full, when the bale may be tied off and the end door opened. This bale, however, will be rough, in consequence of having nothing compact to commence the bale against. The operation now changes, and the pressing, instead of being performed in the bale-chamber C, is completed in the press-box B, and the compressed sections forced into the bale-chamber where they are retained by the retaining shoulders H, and the finished bale ejected as fast as the compressed sections are forced behind the shoulders, and the bale finished against the door, which is closed after the bale is removed, thus building up the bale in pressed sections piled one against another endwise; and the operation is thus continued, the first bale only being roughly put up.

Having thus described my invention, I claim as follows:

1. The horizontal press-box and bale-chamber B C, in combination with the receiving box or hopper A, having an adjustable bottom, substantially for the purpose set forth.

2. The press-box B and hopper A, provided with a movable bottom, in combination with the pitman and crank or toggle L F, substantially for the purpose set forth.

3. The combination of the roller D with the hopper A, press-box B, and plunger E, for the purpose set forth.

4. The slots I I I, in combination with the bale-chamber C, provided with shoulders or retainers H, substantially for the purpose set forth.

5. The above-described method of successively ejecting finished bales from the press by means of additional charges of material pressed against it.

6. The close horizontal press-box B C, constructed with an opening or orifice at the top for feeding, as at A, and provided with horizontal tying-slots on each side, substantially as and for the purpose set forth.

7. The combination of the sweep or horse lever with the crank F and pitman L, for operating the plunger of a baling-press.

P. K. DEDERICK.

Witnesses:
A. M. DEDERICK,
JAMES RORABACK.